J. M. LAUBY.
STOVE-PIPE ELBOWS.
No. 193,970. Patented Aug. 7, 1877.
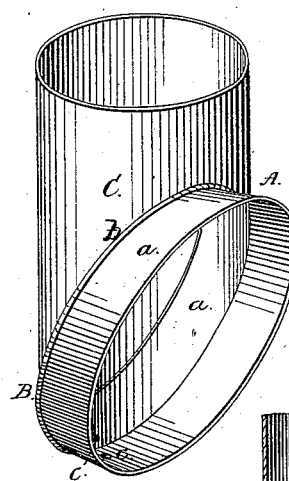
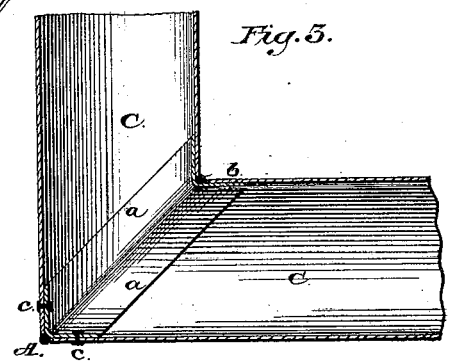
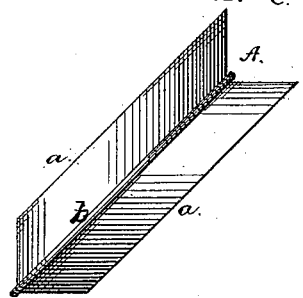
Witnesses,
J. H. Hudson
J. J. R. Pease
Inventor,
Joseph M. Lauby

UNITED STATES PATENT OFFICE.

JOSEPH M. LAUBY, OF BRODHEAD, WISCONSIN, ASSIGNOR OF ONE-HALF HIS RIGHT TO CHARLES LAUBY, OF SAME PLACE.

IMPROVEMENT IN STOVE-PIPE ELBOWS.

Specification forming part of Letters Patent No. 193,970, dated August 7, 1877; application filed April 2, 1877.

*To all whom it may concern:*

Be it known that I, JOSEPH M. LAUBY, of Brodhead, in the county of Green and State of Wisconsin, have invented a new and useful Improvement in Stove-Pipe Elbows, which improvement is fully set forth in the following specification, and accompanying drawings, in which—

Figure 1 is a perspective view of one-half of an elbow with connecting oval ring in readiness to receive the other half, which is an exact duplicate except the oval ring. Fig. 2 is a side view of the connecting oval ring separate from the other parts of the elbow. Fig. 3 represents a central longitudinal section of the completed elbow.

The object of my invention is to furnish a device by which to connect the two parts of an elbow, so as to make the connection stronger and more durable than the ordinary mode of joining the parts by a seam, and at the same time make a saving in material and labor in the construction and manufacture of stove-pipe elbows.

In the drawing, A is an oval connecting-ring with flanges $a$ $a$ to receive the two parts of the sheet-iron pipe C C forming the elbow. $b$ is a welt, raised through the center or at the angle of the ring longitudinally. B is the elbow, composed of its parts C C, with holes $c$ $c$ in the points of the same, with corresponding holes in flanges $a$ $a$ upon oval ring A, to receive rivets to hold the parts in place.

It will be seen, from the above, that an elbow constructed in this manner requires no seam or lock to be turned in the iron; but the two parts of the elbow C C are, when cut to a miter or to the desired angle, slipped onto the ring A; or, if desired, the two parts C C may be made small enough to slip into the ring. In that case ring A would be upon the outside, and holes $c$ $c$ would, from necessity, be in the inner or short side of the parts C C instead of at the points. The reason for this is, that when the parts C C are slipped onto ring A the short sides of parts C C are held by the flanges of the ring, and the long sides by the rivets; but when parts C C are slipped into the oval ring the reverse is true, and the long sides of parts C C are held by the ring and the inner or short sides by the rivets. In the latter case welt $b$ would be dispensed with. The object of welt $b$ is to form a stop for the edge of the parts C C to abut against, and it may be hammered down, and thereby produce a tight joint. When the parts C C are placed upon the inside of the ring A, the ring itself forms a stop, and welt $b$ is unnecessary.

I form oval ring A with its flanges $a$ $a$ by making two rings of sheet metal, and after giving them an oval shape and bending them in the proper form, I lock the two together, raising the welt $b$ by the lock on seam; but it is contemplated making the oval ring A by using one ring of sheet-iron, or other metal, and pressing it into the desired shape by dies or swages, as shown, with its flanges $a$ $a$.

With these oval rings properly provided, elbows can be made with less labor, and cheaper iron can be used for the parts C C, and may be cut either way of the iron, thereby saving in material. When the parts are in readiness, they are put together, and the rivets through the holes $c$ $c$ make the whole strong and durable.

I claim as my invention—

1. A stove-pipe elbow consisting of oval connecting-ring A, with its flanges $a$ $a$, holes $c$ $c$, in connection with parts C C, and welt $b$, arranged as described, and for the purposes set forth.

2. The combination of parts C C of a stove-pipe elbow, with oval connecting-ring A, with its flanges $a$ $a$, and welt $b$, as described, and for the purposes set forth.

JOSEPH M. LAUBY.

Witnesses:
S. H. HUDSON,
J. J. R. PEASE.